Jan. 8, 1963 — L. E. MINEAH — 3,071,855
PROCESS FOR MANUFACTURING STRUCTURAL METAL BARS
Filed Aug. 14, 1959 — 2 Sheets-Sheet 1
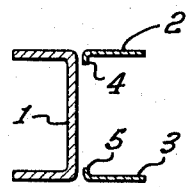
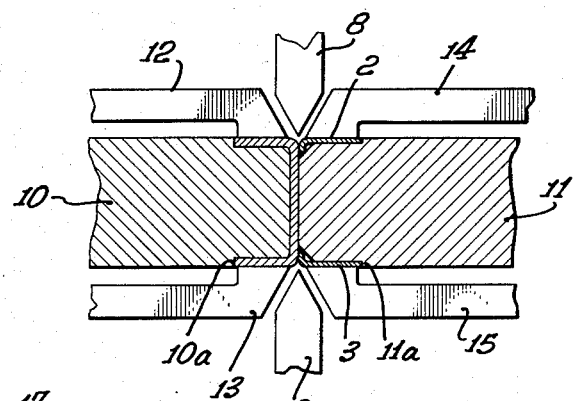
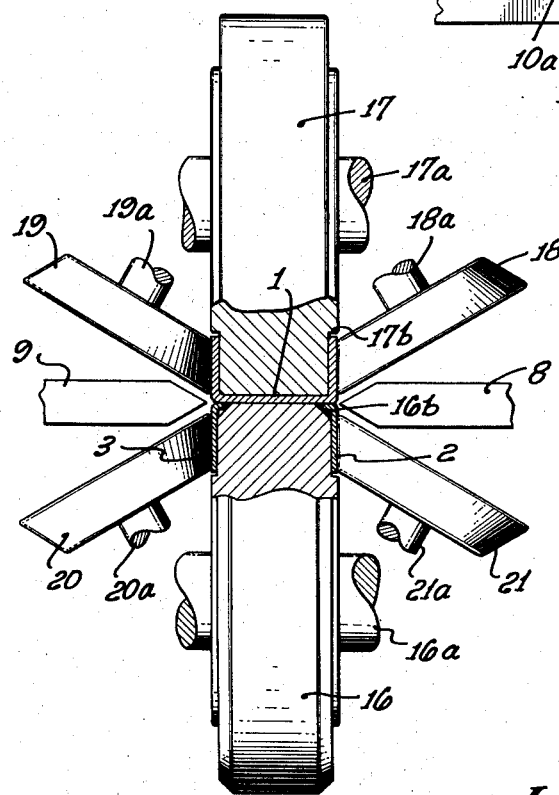
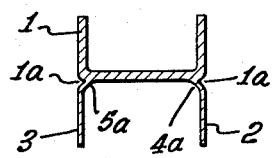
LAWRENCE E. MINEAH
INVENTOR.
BY Flam and Flam
ATTORNEYS.

Jan. 8, 1963 L. E. MINEAH 3,071,855
PROCESS FOR MANUFACTURING STRUCTURAL METAL BARS
Filed Aug. 14, 1959 2 Sheets-Sheet 2
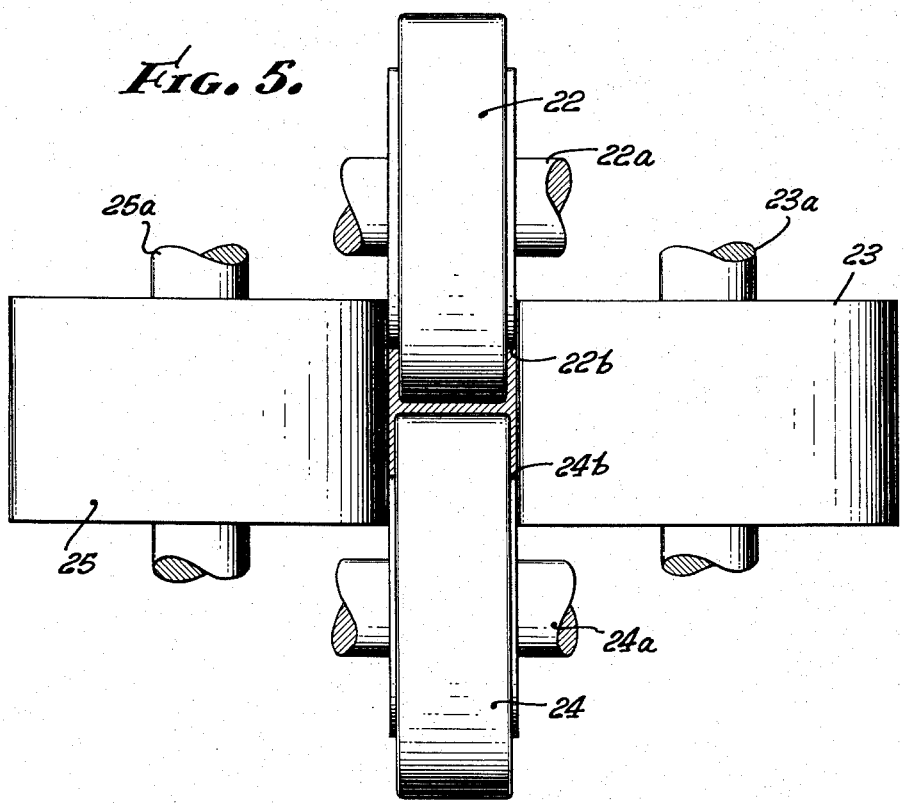
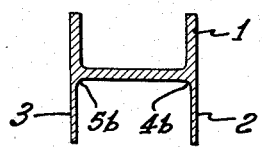
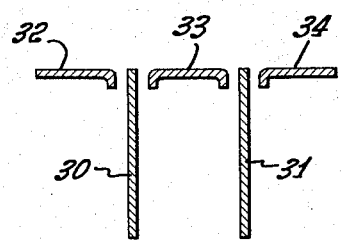
LAWRENCE E. MINEAH
INVENTOR.
BY Flam and Flam
ATTORNEYS.

United States Patent Office 3,071,855
Patented Jan. 8, 1963

3,071,855
PROCESS FOR MANUFACTURING STRUCTURAL METAL BARS
Lawrence E. Mineah, Escondido, Calif., assignor to Coast Pro-Seal & Mfg. Co., Los Angeles, Calif., a corporation of California
Filed Aug. 14, 1959, Ser. No. 833,803
1 Claim. (Cl. 29—480)

This invention relates to the manufacture of structural elements adapted to be used for aircraft or other light weight, high strength applications.

In very high speed aircraft the exposed surfaces must be formed accurately with the contour predetermined by the design. Also as performance requirements increase, the weight of structure becomes more and more critical. Increasing speeds also result in high temperatures which tend to reduce the structural ability of the material used in fabrication. As a result it becomes necessary to introduce structural elements having the lightest possible weight for a given strength. Accordingly, it is now the practice to use materials such as heat treatable stainless steels possessing the high requisite resistance to stress and also the necessary strength characteristics at high temperature. In order to obtain the desired economy of weight each element of such structural members must be designed to provide no more than required for that element. For the above reasons good design requires that flanges or elements in a structural member be of different thicknesses and the tolerances be extremely close. Structural sections conforming to these requirements can be produced by machining out of solid bars and by other means but such processes are extremely expensive and laborious to produce. Further, the production of extremely thin sections from large billets or bars by machining does not take advantage of the best possible metal condition in that the metallurgical condition of metal within such bars or billets is not 100% good and the thin elements produced from them must necessarily for this reason be introduced into a complex structural component at considerably less than the ultimate allowable stresses normally set up for the material used.

One of the objects of this invention is to achieve the exacting requirements for light weight structures as outlined above at a much lower cost.

It is another object of this invention to provide structural members under such conditions of control that substantially a 100% advantage can be taken of the materials from which they are fashioned; and because they are produced from material which is initially made in the thickness in which it is used in the finished article, full control of metallurgical conditions can be maintained. As a result such sections can be introduced into a complex structure at substantially 100% of the design strength of the material.

It is still another object of this invention to provide both a piece-by-piece and continuous process for providing such sections. It is also assumed that in providing such sections normal annealing and heat treating processes may be introduced at various stages in the operation as required.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claim.

FIG. 1 is an end view of the elements comprising a structural section incorporating the invention;

FIG. 2 is a view, mainly diagrammatic, for illustrating the method in which these elements may be clamped and welded in a piece by piece manner;

FIG. 3 is a view similar to FIG. 2, of an alternative method, utilizing cooperative rolls and welding devices necessary to the production of the elements in a continuing process;

FIG. 4 is an end view of the approximate cross section arrived at after welding by either of the processes of FIG. 2 or 3;

FIG. 5 illustrates the rolling operation with four cooperating rolls which reduce the welded section to the proper dimensions and metal condition;

FIG. 6 is a view similar to FIG. 4, but illustrating the sections after appropriate rolling; and FIG. 7 is a view similar to FIG. 1 of a modified form of the section.

In FIG. 1 a channel section (1) produced from sheet metal by a standard roll forming procedure is shown in joining position with thin metal elements 2 and 3, produced by the same method, and intended to form generally an H section. The thickness of elements 2 and 3 is purposely chosen as substantially less than the thickness of the metal of channel 1. This choice illustrates the selection of required cross sections to obtain the prescribed resistance to stress without adding unnecessary weight.

The materials for elements 1, 2 and 3 are weldable alloys and must necessarily be of the same alloy in order that proper welding may be obtained. Such alloys are presently well known. In order to join elements 2 and 3 as by welding or fusing of metal to channel 1, each of the elements 2 and 3 has inwardly turned bases at 4 and 5. These bases may be turned in other directions. Their sole purpose is to provide filler metal for the weld. This is desirable as opposed to the standard method of supplying filler metal from a separate source for two reasons, one, the amount supplied can be closely controlled, and, two, the metal supplied in this manner is necessarily of exactly the same chemical composition as the rest of the element.

For the purpose of the welding, extreme accuracy of location of the various elements in relationship to each other is required. In FIG. 2 there is shown a possible method of clamping such elements in fairly long lengths in such a manner as to allow such welding. A fixture bar 10 usually of copper, is positioned in the proper relationship to another fixture bar 11 of the same type in a suitable machine designed for the purpose and readily available. Additional clamping bars 12, 13, 14 and 15 are used to additionally locate the various elements in the section under consideration.

Welding units 8 and 9 as for example welding electrodes travel along the positioned member and fuse the metal together. Such units 8 and 9 are representative of other electric types of welding such as resistance or induction heating. These units 8 and 9 may both operate at once, but it is customary on standard welding machines to weld one side at a time. The shape of the positioning devices 10, 11, 12, 13, 14 and 15 are such as to control the flow of the molten metal in the weld and to chill it at fusing. These shapes can be changed to allow for the best possible welding conditions as required by various sections and types and thicknesses of metal. These positioning devices contact substantially all of the surfaces of the elements making up the H section. The device 11 however has cut away corners to accommodate bases 4 and 5; and both elements 10 and 11 have shoulders 10a and 11a to contact the outer edges of the flanges of the channel 1, and of the elements 2 and 3.

Should it be desired to produce sections in lengths longer than is economically feasible by the piece by piece method or should high production requirements require the same, the section may be produced in a continuous process. FIG. 3 shows a cooperating set of six rolls 16, 17, 18, 19, 20 and 21. These rolls would hold various elements of the section momentarily in position in the same manner as the clamp bars 10, 11, 12, 13, 14 and 15 in FIG. 2. These rolls 16, 17, 18, 19, 20 and 21 may be introduced into the same machine as that used to produce the parts 1, 3 and 4, thus making the complete operation a continuous process. In the case of the continous process, the cooperating rolls shown in FIG. 3 might or might not become part of the same operation, depending on the type of material being used and the necessity for heat treating operations between welding and re-rolling. In any event, the roller set up in FIG. 3 would work towards exactly the same end as the clamping set up in FIG. 2.

The rolls 16 and 17 are rotatably mounted by the aid of the parallel shafts 16a and 17a. The rolls 18, 19, 20 and 21 engaging the outer surfaces of the flanges of the H-section are conical and similarly appropriately mounted on shafts 18a, 19a, 20a and 21a.

As in the form shown in FIG. 2, all of the exposed surfaces of the elements making up the H-section are contacted by the rolls. Furthermore, the rolls 16 and 17 provide shoulders, such as 17b, to accommodate the four edges of the flanges of the H-section. The corners 16b of the roll 16 are bevelled in order to accommodate the bases 4 and 5 of the elements 2 and 3.

FIG. 4 shows the various elements of the section as they appear after being welded, as described in connection with FIGS. 2 and 3. All of the various elements are now joined together by the weld. The bases 4 and 5 are now integrally joined to form somewhat flattened fillets 4a and 5a, and concavities 1a adjacent to the flanges of channel 1.

After the weldment per FIG. 4 is completed, the completed weldment is then processed by aid of rolls shown in FIG. 5. Annealing or heat treating operations may occur prior to entering the welded elements, as shown in FIG. 4, between the rolls shown in FIG. 5. In FIG. 5, the part is passed through cooperating sets of rolls 22, 23, 24 and 25 in such a manner as to reduce the section to the desired shape. This may need several sets as required reduction cannot be accomplished in one pass. This is necessary for several reasons. In the first place, considerable weld distortion results from the welding process in FIGS. 2 and 3. In the second place, it is impossible to force the molten metal in the weld to go exactly on to the desired location. In the third place, it is desirable to do a certain amount of the reducing of the weld metal to improve its physical characteristics. The rolls 22, 23, 24 and 25 in FIG. 5 are intended to accomplish all three of these purposes.

These rolls may all be hardened and mounted for rotation respectively on the shafts 22a, 23a, 24a and 25a. The rolls are adapted to contact all of the surfaces of the H-element. Furthermore, by continued setting of the section through these rolls, the dimensions to some extent may be controlled. For example, the overall width of the H is usually reduced in order to eliminate the concavities 1a in the form illustrated in FIG. 4. The rolls 22 and 24 may be provided with shoulders, such as 22b and 24b, to accommodate the edges of the flanges.

FIG. 6 shows the finished article. At the inner corners 4b and 5b, the metal which was originally in the bases of elements 2 and 3 has now been fused by welding into the parent metal and by rolling has been reduced to fillets of the proper size, and the section now has no surplus metal at any point and has flat, perfectly finished surfaces on all sides. Other sections or entirely different configurations can be produced by the same method, and these sections may be produced from elements of a multiplicity of thicknesses or all from the same thicknesses. Such other section is indicated in FIG. 7, wherever the elements 30 and 31 are flat strips, and the other elements 32, 33 and 34 are of thinner material.

It is, of course, feasible to produce a heat necessary for welding by means other than an electric arc.

The inventor claims:

The process of forming accurate structural sections of indefinite length, from metal parts having parallel flat surfaces, which comprises: bending strips of the material to form a contacting surface; holding said contacting surfaces against a flat surface of a channel shaped part to form a substantially H-shaped section; fusion welding the said surfaces together; said welding resulting in concavities at the bend of the strips; rolling the strips and the part, between rolls, said rolls having rolling faces engaging substantially the entire flat surfaces of all of the strips and the part, for cold working the material; and repeating the rolling operation for reducing the concavity and for reducing the fillets between at least some of the welded parts.

References Cited in the file of this patent

UNITED STATES PATENTS

| | | |
|---|---|---|
| 939,676 | Emery | Nov. 9, 1909 |
| 1,769,078 | Smith | July 1, 1930 |
| 1,812,246 | Oberg | June 30, 1931 |
| 1,917,901 | Rohlfing | July 11, 1933 |
| 2,088,120 | Smith | July 27, 1937 |
| 2,237,716 | Spaulding | Apr. 8, 1941 |
| 2,771,669 | Armstrong | Nov. 27, 1956 |